US011176784B2

(12) United States Patent
Marks

(10) Patent No.: US 11,176,784 B2
(45) Date of Patent: Nov. 16, 2021

(54) INTERACTIVE ELECTRONIC REEL GAMING MACHINE PROVIDING A FEATURE WHEEL SPIN

(71) Applicant: Aristocrat Technologies Australia Pty Limited, North Ryde (AU)

(72) Inventor: Daniel Marks, Decatur, GA (US)

(73) Assignee: Aristocrat Technologies Australia Pty Limited

( * ) Notice: Subject to any disclaimer, the term of this patent is extended or adjusted under 35 U.S.C. 154(b) by 8 days.

(21) Appl. No.: 16/117,237

(22) Filed: Aug. 30, 2018

(65) Prior Publication Data

US 2019/0073879 A1 Mar. 7, 2019

Related U.S. Application Data

(63) Continuation-in-part of application No. 29/616,129, filed on Sep. 1, 2017, now Pat. No. Des. 910,044.

(60) Provisional application No. 62/553,974, filed on Sep. 4, 2017.

(51) Int. Cl.

| | |
|---|---|
| ***A63F 9/24*** | (2006.01) |
| ***A63F 13/00*** | (2014.01) |
| ***G07F 17/00*** | (2006.01) |
| ***G07F 19/00*** | (2006.01) |
| ***G07F 17/34*** | (2006.01) |
| ***G07F 17/32*** | (2006.01) |

(52) U.S. Cl.
CPC .......... *G07F 17/34* (2013.01); *G07F 17/3213* (2013.01); *G07F 17/3267* (2013.01)

(58) Field of Classification Search
CPC ............. A63F 17/3202; A63F 17/3244; G07F 17/3202; G07F 17/3244
See application file for complete search history.

(56) References Cited

U.S. PATENT DOCUMENTS

| | | | | |
|---|---|---|---|---|
| D645,878 | S | 9/2011 | Cavanaugh | |
| 9,327,188 | B2 * | 5/2016 | Munakata | G07F 17/3211 |
| D770,474 | S | 11/2016 | Loosli | |
| D784,371 | S | 4/2017 | Loosli | |
| D793,437 | S | 8/2017 | Orr | |
| D823,329 | S | 7/2018 | Jeon | |
| D828,367 | S | 9/2018 | Gossling | |
| 10,068,415 | B2 * | 9/2018 | Humphrey | G07F 17/34 |
| D847,179 | S | 4/2019 | Chevrier | |
| D858,558 | S | 9/2019 | Sabatelli | |
| D875,109 | S | 2/2020 | Upton | |

(Continued)

OTHER PUBLICATIONS

Notice of Allowance dated Sep. 16, 2020 for U.S. Appl. No. 29/616,129 (pp. 1-8).

*Primary Examiner* — Milap Shah
*Assistant Examiner* — Jason Pinheiro
(74) *Attorney, Agent, or Firm* — McAndrews, Held & Malloy, Ltd.

(57) ABSTRACT

An interactive electronic gaming machine that includes a spinnable feature wheel is disclosed. The interactive electronic gaming machine is a video slot machine game that includes a base game and one or more bonus features. The bonus features may include a spinnable feature wheel displayed on a plurality of display screens, each located above one of a plurality of electronic gaming machines. The spinnable feature wheel can spin horizontally across the display screens in a sequence coordinated by a central game controller via respective electronic gaming machines.

20 Claims, 8 Drawing Sheets

(56) References Cited

U.S. PATENT DOCUMENTS

| | | | | |
|---|---|---|---|---|
| D877,159 | S | 3/2020 | Derby | |
| D878,406 | S | 3/2020 | Okumura | |
| 2008/0102916 | A1* | 5/2008 | Kovacs | G07F 17/3211 463/16 |
| 2009/0124345 | A1* | 5/2009 | Gilmore | G07F 17/32 463/20 |
| 2009/0325671 | A1* | 12/2009 | Kelly | G07F 17/34 463/20 |
| 2010/0216536 | A1* | 8/2010 | Gagner | G07F 17/3276 463/16 |
| 2012/0115608 | A1* | 5/2012 | Pfeifer | G07F 17/3225 463/35 |
| 2013/0225275 | A1* | 8/2013 | Johnson | G07F 17/326 463/25 |
| 2014/0080563 | A1* | 3/2014 | Johnson | G07F 17/3225 463/13 |
| 2014/0171188 | A1* | 6/2014 | Smith | G07F 17/3258 463/25 |

* cited by examiner

435

435

INTERACTIVE ELECTRONIC REEL GAMING MACHINE PROVIDING A FEATURE WHEEL SPIN

RELATED APPLICATION(S)

The present application claims priority to U.S. Provisional Patent Application No. 62/553,974, filed Sep. 4, 2017, and entitled "A GAMING SYSTEM AND METHOD OF GAMING" which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Conventional electronic reel games display three reels that represent mechanical reels. Such conventional games accepted a single input (e.g., start), and show a row of symbols, typically three in a vertically spinning reel. All three symbols must match to provide an award. Gaming machines that offer these types of games provide limited functionality, and allow for limited player interaction. A need exists in the industry to improve gaming machine operations and player interactions.

SUMMARY

Systems, devices and methods for an interactive electronic reel game that includes a feature wheel spin are disclosed. In disclosed examples, a gaming machine includes a first display, a second display; and a game controller executing instructions which cause the game controller to, at least control the second display to display a first wheel symbol of a plurality of wheel symbols, control the second display to visually move the first wheel symbol from the second display onto a third display in accordance with a predetermined sequence, control the second display to display a second wheel symbol of the plurality of wheel symbols as the first wheel symbol of the plurality of wheel symbols moves onto the third display, and stop the movement of the first wheel symbol and the second wheel symbol leaving the first wheel symbol displayed on the third display and the leaving second wheel symbol displayed on the second display as a winning wheel symbol.

In some examples, a gaming machine includes a credit input mechanism, a first display, a second display, a cashout mechanism, and a game controller. The game controller executes instructions which cause the game controller to, at least, upon occurrence of a trigger event, switch the central controller to a shared bonus display mode, control the second display to display a first wheel symbol of a plurality of wheel symbols, control the second display to visually move the first wheel symbol of the plurality of wheel symbols off the second display, control a third display of another gaming machine via the central controller to display the first wheel symbol in accordance with a predetermined sequence, control the second display to display a second wheel symbol of the plurality of wheel symbols as the first wheel symbol of the plurality of wheel symbols moves onto the third display; and continue to move the first and second wheel symbols of the plurality of wheel symbols in a continuous loop from the second display to the third display for a predetermined period of time.

In disclosed examples, a method of employing a plurality of gaming machines to display a spinnable feature wheel includes receiving an item to establish a credit balance via a credit input, the credit balance being increasable and decreasable based at least on wagering activity, generating a trigger event in response to an outcome of a base game displayed on a first display of a first gaming machine of the plurality of gaming machines, selecting, via a game controller, a plurality of wheel symbols based on the trigger event, displaying a first wheel symbol of the plurality of wheel symbols on a second display of the first gaming machine of the plurality of gaming machines, visually moving the first wheel symbol from the second display onto a third display of a second gaming machine of the plurality of gaming machines in accordance with a predetermined sequence, visually moving a second wheel symbol on the second display as the first wheel symbol moves onto the third display, stopping the movement of the first wheel symbol and the second wheel symbol leaving the first wheel symbol displayed on the third display and the second wheel symbol displayed on the second display as a winning symbol, and increasing the credit balance by an amount corresponding to an award amount associated with the winning wheel symbol.

DETAILED DESCRIPTION

Figure 1:
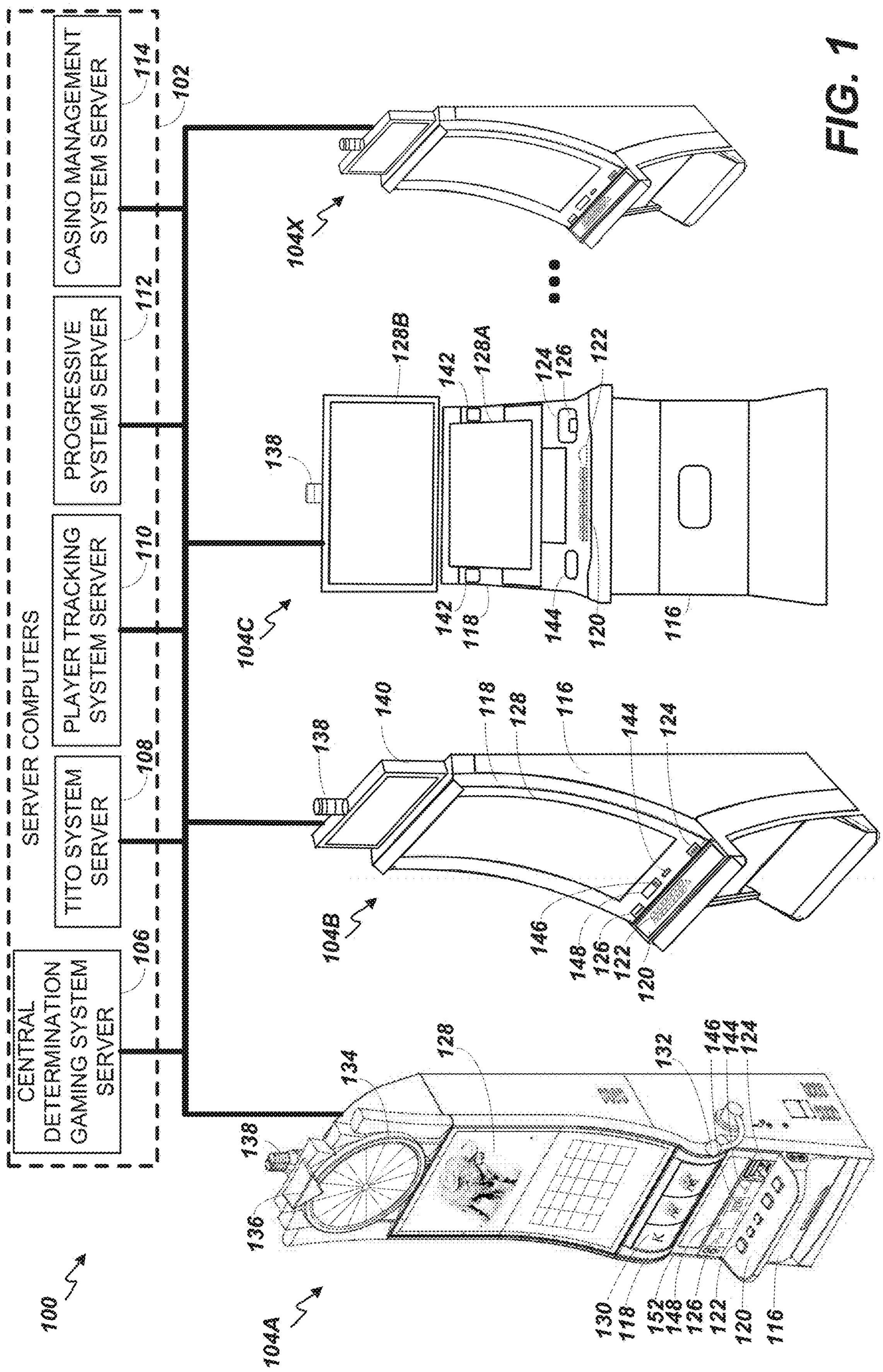
FIG. 1 is an exemplary diagram showing several electronic gaming machines networked with various gaming related servers.

Systems, devices and methods for an interactive electronic reel game that includes a feature wheel spin are disclosed. For instance, the disclosed interactive gaming machine, in various embodiments, is a video slot machine game that includes a base game and one or more bonus features. The bonus features may include a feature wheel formed from a plurality of display screens, each located above one of a plurality of electronic gaming machines. The feature wheel can spin across the display screens in a sequence coordinated by a central game controller via the respective electronic gaming machine.

For example, the base game provided on the main display relies upon a plurality of reels (e.g., two or more) that create a symbol matrix of multiple columns and rows that correspond to plural displayed symbol positions (e.g., five columns and three rows with 15 symbol positions). The symbols appearing in these symbol positions can produce awards in accordance with one or more reel patterns (e.g., via the 243 Reel Power patterns). Additionally or alternatively, the base game may define pay lines and issue awards based upon the appearance of symbols upon these pay lines. The particular combinations generating awards and the amount of these awards (e.g., Line Pays) may be predetermined and/or defined by a pay schedule.

As described more fully with respect to the several figures, the interactive EGM of the present disclosure provides a non-conventional arrangement for an EGM, in particular, an electronic reel game. For example, in the interactive reel game described with respect to FIGS. 3-7, in response to a particular trigger event (e.g., a predetermined outcome, award, etc.), the base game can initiate a feature wheel spin bonus operation. The feature wheel spin provides an opportunity for the player to increase the award over one or more additional reel spins. For example, as disclosed herein, the feature wheel spin may be presented on one or more monitors arranged so as to be visible to multiple viewers. For instance, one or more secondary displays may be located at an elevated position above one or more individual electronic gaming machines (EGMs). The feature wheel spin is configured to move one or more symbols through the one or more secondary displays in a sequence. As the feature wheel spin comes to a stop, one or more identifiers and/or credit values are presented to the player(s). In some examples, other players may be offered to the opportunity to join in the feature wheel spin and may also benefit from the outcome.

In view of the foregoing, the interactive EGMs described herein provide significant improvements over conventional electronic gaming systems. For example, conventional gaming systems operate as self-contained units, and are not capable of coordinating with other systems. This inherent limitation prevents any number of operations that would require coordination and/or synchronization between different machines.

Advantageously, the disclosed interactive EGMs communicate with a central game controller which may be employed to coordinate triggering information and/or implement a feature wheel spin across multiple EGMs. For example, in response to a trigger event that occurs during a base game played on a first, personal display of an EGM, wheel symbols for feature wheel are selected and displayed on a second display which may be located at an elevated position and therefore visible to others viewers.

In disclosed examples, in response to the trigger event, trigger information from the triggering EGM is shared with other EGMs, such as via a central game controller or a central progressive controller which distributes the trigger information. This information may include specifics relating to timing, type and/or number of wheel symbols, as well as the predetermined sequence by which the wheel symbols are displayed. In some examples, the files and/or media for display are located with each EGM, allowing for an immediate response to the trigger once the information is distributed.

By the transmission of control information, and using the control information to initiate a feature wheel spin operation based on media and/or data stored at a respective electronic gaming machine. The EGM controls the second display to display the wheel symbols, and to visually move each wheel symbol from the second display onto another elevated display of another EGM (e.g., in a bank of EGMs) in accordance with a predetermined sequence.

The coordinating information allows the wheel symbols to move continuously from the second display of the triggering EGM to the other elevated display in a loop in accordance with the triggering information, the predetermined sequence, selected wheel symbols, etc. Further, the central game controller may be connected to any number of EGMs (e.g., three or more), such that the wheel symbols are displayed as a continuously spinning horizontal reel across the multiple elevated display screens.

The use of a central game controller, in addition to or in the alternative to an individual gaming controller, ensures seamless operation of shared feature wheel spin elements, provides efficient use of computing resources, and further enhances the output of gameplay and the shared sense of enjoyment during gameplay. Thus, the disclosed examples advantageously provide improved response times, expanded functionality, and an enhanced user experience accordingly.

By contrast, conventional gaming systems are linked to a single display, and unable to effectively coordinate operations with other electronic gaming machines and/or displays. Thus, the disclosed are EGMs capable of presenting a continuous feature wheel operation, with a faster response time having seamless transitions between symbols across the multiple electronic gaming machines in contrast to conventional systems.

FIG. 1 illustrates several different models of EGMs, which may be networked to various gaming related servers. Shown is a system 100 in a gaming environment including one or more server computers 102 (e.g., slot servers of a casino) that are in communication, via a communications network, with one or more gaming devices 104A-104X

(EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, be practiced on a standalone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction, which may be aligned in rows or banks of similar devices for placement and operation on a casino floor. The gaming device 104A often includes a main door 154 that provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118, which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel, which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player-tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152, which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
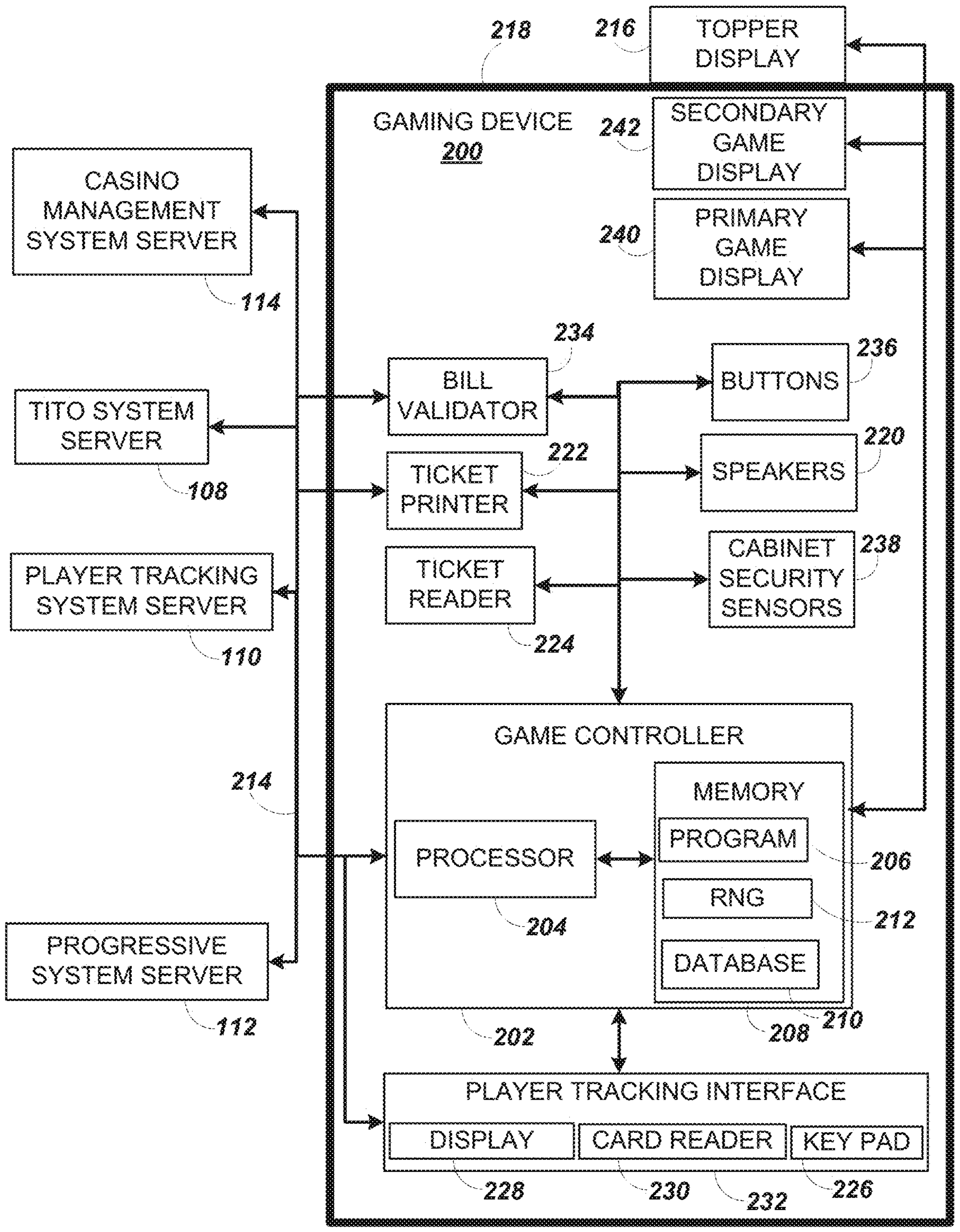
FIG. 2 is a block diagram showing various functional elements of an exemplary electronic gaming machine.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154, which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

In the embodiment, the game controller controls generation and display of one or more special regions or zones and the application of multipliers, etc. by use of the RNG, as discussed in more detail with respect to the several figures. Additionally, an award amount is awarded based on play of a reel game that includes the special region.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win by the corresponding win amount. The player can add additional credits to the credit balance at any time. The player may also optionally insert a loyalty club card into the card reader 230. During the game, the player views the game outcome on one or more of the primary game display 240, and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touchscreen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222 or other cashout mechanism). The ticket may be "cashed-in" for money or inserted into another machine to establish a credit balance for play.

As described with respect to the several figures, each gaming machine of a bank of electronic gaming machines (EGMs) is paired with a secondary display, to create a "duplicated display" such that events displayed on a player's EGM are replicated in real-time across the secondary display, a tertiary display, and/or set of displays. This duplicated display feature allows players to enjoy the displayed event in a personalized and accessible manner using the display of their slot machine and, at the same time, allows everyone around the player to share in the event via the secondary or tertiary displays.

Figure 3:
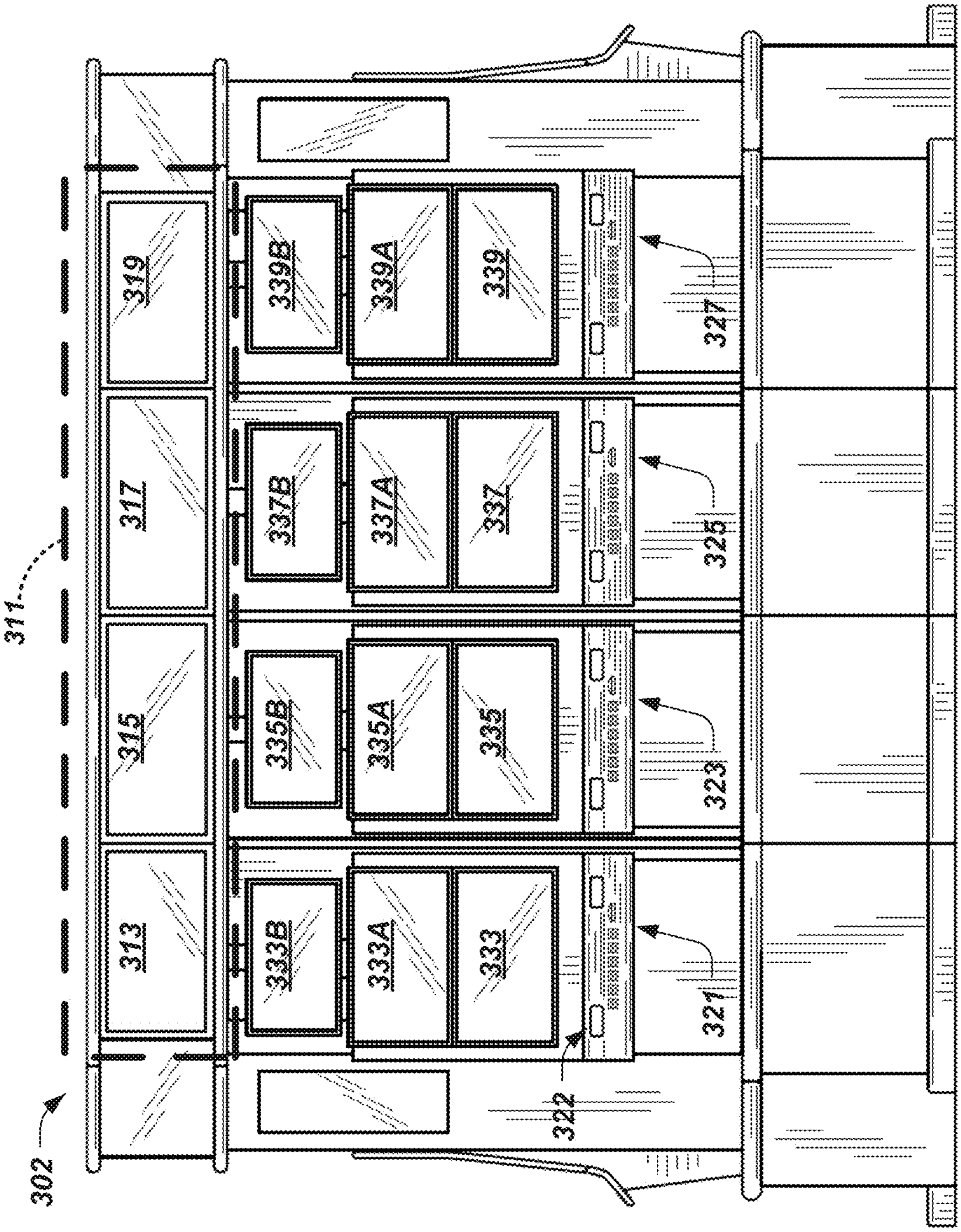
FIG. 3 illustrates an example bank of electronic gaming machines.
Figure 4:
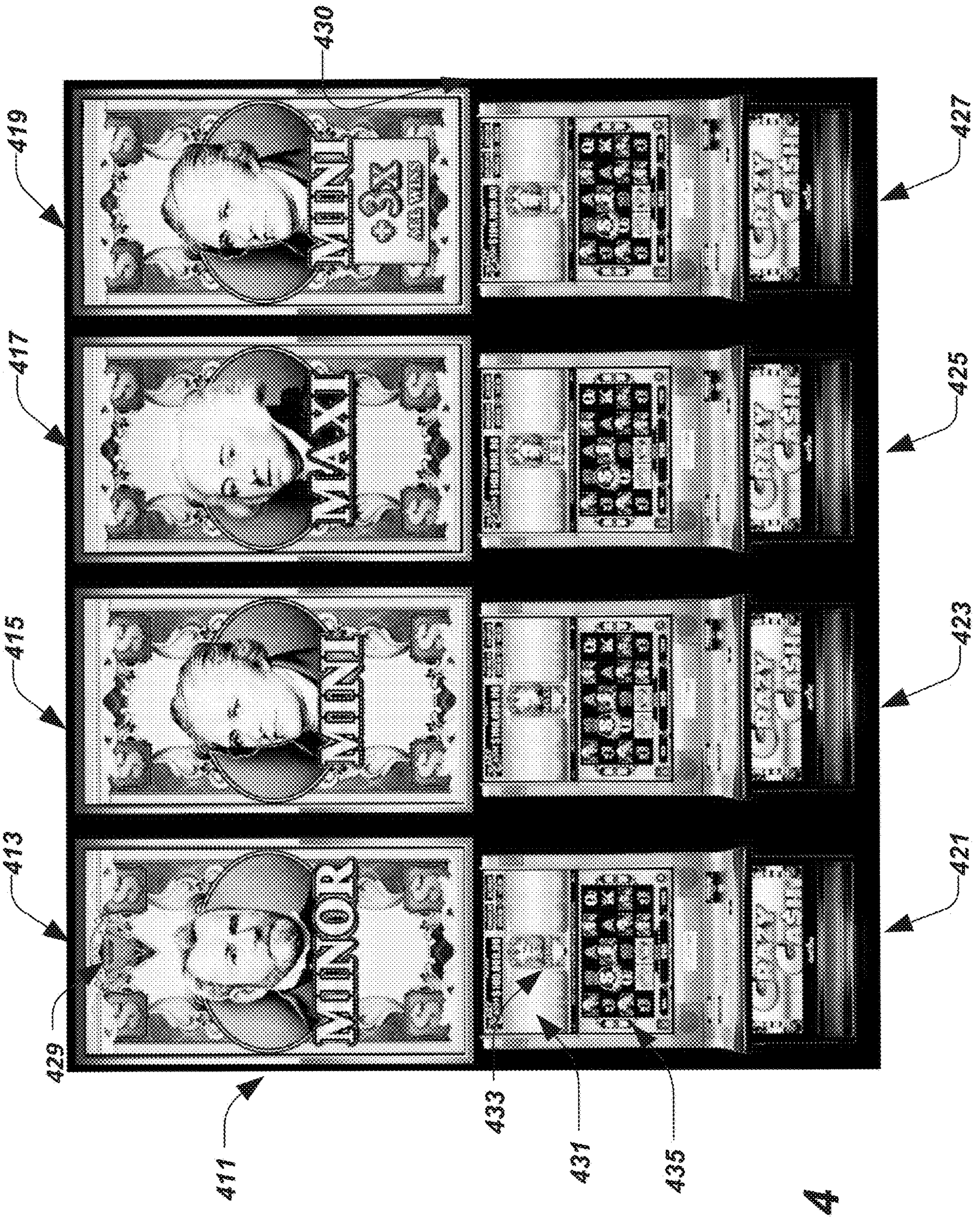
FIG. 4 illustrates another example bank of electronic gaming machines.

Systems, devices and methods for an interactive electronic reel game are disclosed. For instance, FIGS. 3 through 5 illustrate an example interactive electronic reel game operating on a gaming machine or device, such as gaming devices 104A-104X, that includes a game controller, such as game controller 202, configured to provide one or more reels presented on one or more displays. In disclosed examples, a particular arrangement of main and secondary displays cooperate to provide personal play (i.e. a base game) as well as a shared feature (i.e. a feature wheel spin operation in a shared bonus display mode). Each EGM can incorporate various themes selected to attract players (e.g., representing popular cultural references, such as icons associated with currency, recognizable celebrities or other characters, etc.). Further, a variety of stimuli can be employed in response to a trigger or outcome (e.g., a winning outcome), including visual, audible, haptic feedback, etc., to engage and inform the player.

For instance, an outcome from a base game can be evaluated with respect to the displayed symbols, such as the value and/or location of a particular symbol(s) within the reel. Pay awards can be made according to the symbols in clusters of display positions, such as when two or more like symbols are located in adjacent display positions. Based on a particular outcome, a feature wheel spin operation is triggered, which initiates a sequence of symbols across a series of secondary displays (collectively, unit 311 in FIG. 3) to spin and stop to generate additional outcomes. The feature wheel spin can be shared with other players, who can also benefit from a favorable outcome.

For example, in response to a trigger from an outcome of a base game, the feature wheel spin may begin. The feature wheel spin may include one or more phases, such that a first feature wheel phase is implemented as a spinnable feature wheel over a plurality of display sections, with each section displaying a symbol and/or value. The symbol is configured to spin horizontally across a primary display of the EGM and, at the same time, one or more secondary displays associated with the triggering EGM and/or other EGMs in the bank. The symbols and/or values may be displayed together or in sections of the spinnable wheel feature, such as to display a numeric value (i.e. number of credits or currency) or a jackpot label (i.e. mini, minor, maxi, major, grand) that is associated with a jackpot amount (i.e. $15, $30, $150, $750), as shown in the example display 431 of FIGS. 6A and 6B.

In some examples, the symbols/values associated with the first feature wheel phase spin horizontally across one or more displays associated with the player's individual EGM (i.e. a secondary or tertiary display screen above the primary screen that displays the sequence of symbols). Additionally or alternatively, the same symbols/values spin horizontally across multiple secondary display screens (i.e. a 55 inch monitor mounted above each EGM, oriented horizontally or vertically) associated with other EGMs within the bank, each secondary display being connected together for the purposes of displaying the spinnable wheel feature in sequence (e.g., by creating a Linked Game environment).

Referring to FIG. 3, a bank of electronic gaming machines (EGMs) 302 is provided. The bank 302 includes a plurality of EGMs 321, 323, 325, 327. Each EGM can include a main display 333, 335, 337, 339 (e.g., a personal screen or monitor) upon which a base game is played. Additionally or alternatively, each EGM may include one or more alternate displays 333A-339A and/or 333B-339B to provide additional information, present game features, and/or display the effects of a feature wheel spin, as described in greater detail, below.

In the bank of EGMs 302, one or more of the EGMs can be selected as supporting the feature wheel operation. For example, one or more of the secondary displays may be configured to display symbols associated with the feature wheel operation in response to a trigger (i.e. from an outcome of a base game). In the example of FIG. 3, four EGMs are included in the bank 302; thus, one to four EGMs may be selected to operate in accordance with a feature wheel spin.

In the example of FIG. 3, each EGM is associated with and configured to control a secondary display 313, 315, 317, 319 that is physically aligned with the respective EGM (i.e. mounted horizontally or vertically, directly above the EGM). The secondary displays are configured to operate as a unit 311, to display symbols and/or animation that represents a feature wheel spin sequence, for example, a spinning wheel operating horizontally across each secondary display within unit 311. In some examples, an EGM may be configured to control a remotely located display or more than one display, depending on the desired effect during the feature wheel operation.

In order to institute a feature wheel operation across the bank of EGMs 302, each EGM includes files and/or instruction (i.e. software and/or hardware) to control sequences associated with one or more feature wheel operations for display across each of the secondary displays. In examples, items/features during a base game that correspond to a triggering event for a specific feature wheel operation may be stored locally in a memory device associated with a respective EGM. In other examples, items/features during a base game that correspond to a triggering event for a specific feature wheel operation may be stored in a memory device associated with a central game controller. In yet other examples, items/features during a base game that correspond to a triggering event for a specific feature wheel operation may be stored in the memory device associated with one or more EGMs and/or in the memory device associated with the central game controller. Customized configurations and/or sequences may be created and/or updated using proprietary tools (e.g. software, firmware, and/or hardware that is created for the specific purpose of implementing the base game and/or the feature wheel), and/or known software architectures, such as GIMP Drawing Kit (GDK).

Once initiated, an EGM will receive a sequence and other instructions associated with the feature wheel spin, such that each single displayed symbols on each monitor is moved in unison to the monitor above the adjacent gaming machine. That is, the symbol presented in display 313 above EGM 321 moves to the display 315 above EGM 323, and then to the display 317 above EGM 325, and then to the display 319 above EGM 327, and then back to the display 313 above EGM 321, and so on in a spinning wheel fashion. Likewise, the symbol on the display 315 above EGM 323 at the time of the trigger event is moved to the display 317 above EGM 325 and then to the display 319 above EGM 327 and then to the display 313 above EGM 321, and back to the display 315 above EGM 323 and so on. Thus, a horizontal wheel is first formed on monitors 313-319 upon a trigger event, and then the wheel is spun.

As a symbol moves from one monitor to the next, the symbols appear to move continuously to a viewer. If moving horizontally from left to right, for example, first the symbol's right side edge appears in the adjacent screen and continuously more and more of the symbol moves into the adjacent screen as less and less of the symbol remains at its first location. As understood, alternatively the symbols may merely "jump" (move as one complete visual) into the adjacent monitor.

In examples, there may be N number of symbols associated with the feature wheel sequence. Where N is greater than the number of secondary displays displaying the feature wheel spin, a wheel symbol and/or value may rotate across the displays, disappear, and then reappear after each other symbol of the sequence has cycled through the displays.

Furthermore, each EGM is configured to implement one or more base games for individual play, in addition to the coordinated feature wheel. In examples, an EGM that did not experience the triggering event continues to operate any base game that is in process. Even during a coordinated feature wheel operation being displayed on a secondary display, a player may initiate a base game on the main display that is not in use for the feature wheel. Even if an EGM is unavailable for the feature wheel operation, the EGM should remain available for individual play of a base game.

Additionally or alternatively, each EGM may be configured to communicate with the central game controller (e.g., a communications and/or control platform such as server computers 102, central determination gaming system server 106, etc.). The central game controller is configured to send and/or receive information and/or instructions to coordinate operation of the EGMs within the bank 302, such as the synced display of symbols as they move through the secondary displays during a feature wheel operation.

Communication with the central game controller may be performed regularly or on demand. In some examples, a regularly timed update may be performed, such as a status check, whereas information regarding specific events (e.g., a trigger, a system failure, etc.) may be sent in response. Based on the information received by the central game controller, instructions may be communicated to the bank of EGMs to perform specific actions, such as initiating the feature wheel operation in response to a triggering event.

Each EGM is configured to update the central game controller on its availability to participate during a feature wheel operation. For example, if an EGM within the bank is experiencing a failure (e.g., a power outage, no connection to secondary/tertiary display, etc.), that EGM may send information to the central game controller that the particular EGM is not available to participate in a feature wheel operation.

For example, an EGM may be available when one or more conditions are satisfied, such as the EGM is not in an active "lock up" state; the EGM is loaded with a game for play; render and update are being called; the host is in normal mode; or a fast reset of the game is not currently underway. In some examples, the central game controller receives information from each EGM regarding each relevant condition, and then makes a determination regarding a particular EGM's availability as well as the availability of the associated secondary display. The central game controller is also configured to request a status update from the EGMs, as described herein. Once determined, the status (availability) of each EGM is stored and/or shared with other EGMs as needed to operate the feature wheel.

Referring now to FIG. 4, a spinnable feature wheel 411 is formed of a plurality of secondary displays 413, 415, 417 and 419, each located above one of a plurality of EGMs 421, 423, 425 and 427, which collectively form a bank of EGMs.

Displays 413-419 may be of a size having a height, for example, of 55 inches. Each monitor 413-419 displays a single symbol of the feature wheel, as shown in FIG. 4. For example, using four EGMs, wheel 411 is formed of four symbols, each symbol being separately displayed in a separate one of the displays 413-419 above the four EGMs. The feature wheel 411 thus may be considered a horizontal reel that moves its four symbols in unison atop the EGMs in the displays, and then stops the symbol movement (i.e. randomly, in accordance with a predetermined sequence, etc.).

Before the trigger event occurs, the displays 413-419 may contain non-symbol information, for example, attraction type visuals (e.g., animation, invitations to play, information associated with game play, etc.), display other information relevant to the play of a game on the corresponding EGM, such as pay table, game outcome, win amount, etc. Additionally, the displays 413-419 may also display jackpot or progressive information, such as the jackpot amount for one or more levels of a progressive jackpot. Upon a trigger event occurring at one of the EGMs, the displays 413-419 located above all the EGMs 421-427 change to display a symbol and thus form a feature reel to be spun.

An identifier 429 (e.g., a red pointer in the example of FIG. 4) is displayed on the monitor above the EGM which triggered the feature wheel spin (i.e. the triggering electronic gaming machine). As shown in FIG. 4, EGM 421 received the trigger for play of the feature game. The symbol that finally comes to rest below the identifier 429 at the stopping of the feature wheel 411 spin is the winning symbol.

In some examples, identifier 429 may be brightly illuminated and/or caused to flash in order that the player's attention may be drawn to it. Additional or alternative features may inform the player of the trigger and/or the winning symbol, such as sound, vibration, etc. Other non-playing observers of the bank of EGMs may also be made aware of the trigger event, such as visually seeing a change in the identifier 429 with the understanding then that EGM 421 received the feature trigger. In examples, the trigger event may be caused by the outcome of the base game of EGM 421, such as in response to a particular set of symbols being displayed on the base game, and/or caused by some other criteria.

Figure 5A:
FIGS. 5A-5B illustrate example displays of the electronic gaming machines of FIGS. 3-4.

In addition to the feature wheel 411 comprised of displays 413-419 above the EGMs 421-427 as shown in FIG. 4, a personal feature wheel is located on each EGM and shown on a separate display area 431 of each EGM, as illustrated in FIG. 5A. Each interactive EGM is a video slot machine game that includes a base game and one or more bonus features. For example, the base game provided on the main display 435 relies upon a plurality of reels (e.g., two or more) that create a symbol matrix of multiple columns and rows that correspond to plural displayed symbol positions (e.g., five columns and four rows with 20 symbol positions). The symbols appearing in these symbol positions can produce awards in accordance with one or more reel patterns (e.g., via one or more of reel power combination payline patterns). Additionally or alternatively, the base game may define pay lines and issue awards based upon the appearance of symbols upon these pay lines. The particular combinations generating awards and the amount of these awards (e.g., paylines) may be predetermined and/or defined by a pay schedule.

In addition to reel power or line pay awards, the game may also issue a scatter pay award based on the appearance of symbols anywhere in the symbol matrix. Scatter pays differ from reel power or line pay awards since the scatter pays do not need to appear in any predefined order or orientation relative to the symbol positions.

For example, a first scatter pay is a bonus feature triggered by the appearance of any two or more value symbol or mystery scatter symbols appearing in the symbol matrix. Each value symbol displays a numeric value (e.g., a number of credits or currency); each mystery symbol display a generic symbol indicating an unknown value (e.g., represented by a question mark). If the two or more scatter symbols do not include a mystery symbol then the game proceeds to the Hold n' Spin phase. If the two or more scatter symbols include a mystery symbol then the game proceeds to additional wheel spin phases such as the Hold n' Spin phase.

In order to trigger a featured wheel spin or operation, a player engaged in a base game would be presented with a winning outcome. For example, the base game may include one or more phases, each with one or more outcomes that may trigger a feature wheel spin. In an example, during a first phase, a wheel presented on the EGM main display spins in response to a user input (e.g., a wager) and then stops to reveal a value. In some instances, the value is used to replace wild or mystery symbols. The symbols may be included in a symbol matrix configured to present a scatter symbol type game, as shown in FIG. 5A. For example, the first phase may be triggered by selection of four predetermined symbols and three mystery symbols. In response, a second phase the mystery symbols and/or wild symbols are converted to a credit or dollar value (e.g., $75).

Additionally or alternatively, a "Hold n' Spin" type base game can be played, such that after an initial reveal of symbols, the game "holds" all of the credit or value symbols in place and spins the remaining symbol positions as individual reel strips (e.g., each symbol can spin as an individual reel). The resulting spin may produce additional value symbols, which are in turn added to the "hold" symbols and remain fixed for the remaining spins, for example over a number of spin/hold cycles. After a predetermined number of spins have completed, the sum total value of all "hold" value symbols is awarded to the player. If all of the symbol positions display a value symbol at any point during the Hold n' Spin game, the game triggers another game to enhance the Hold n' Spin award.

During each game and/or phase presented to the player on a respective EGM, additional or alternative symbols/values may be used. In some examples, the symbols/values of the second feature wheel phase contain different values that include multipliers (i.e. 2× or 3×) or multipliers associated with jackpots (i.e. 2×+Grand; 3×+Major; etc.), as shown in FIG. 4. The multiplier values may indicate that the symbols/values of the second feature wheel phase contributes to the sum total value of all "hold" value symbols collected in the Hold n' Spin phase (i.e. 2× doubles the sum total value). Thus, the jackpot enhances the Hold n' Spin winning award by the amount of the jackpot (i.e. $5000 or some other amount as shown in FIG. 6B).

Figure 5B:
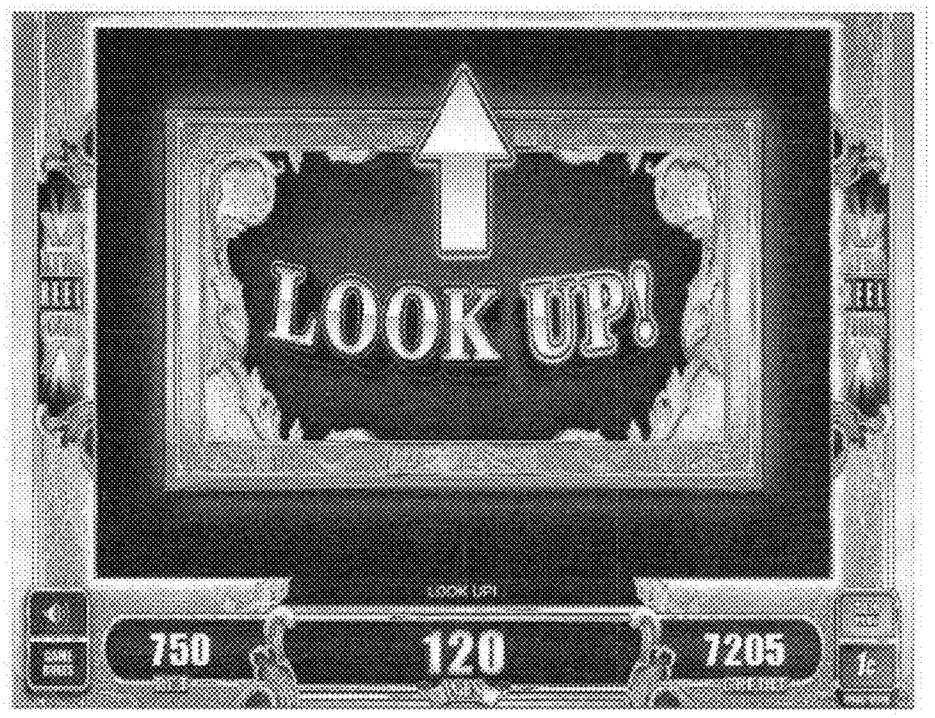

After the final spin and an outcome has been achieved, the EGM will determine whether the outcome corresponds to a trigger for a feature wheel spin. If no trigger is recognized, the player is invited to make another wager and continue with the base game. If a trigger is recognized, the EGM selects a particular feature wheel spin for presentation. A particular value award may correspond to a predetermined feature wheel spin, the player may indicate a favored feature wheel spin (e.g., via an input, associated with a particular character, theme, etc.), the selection may be random, etc. For example, the main display 435 may transition to a graphic indicating a feature wheel spin is about to begin, as shown in FIG. 5B.

Once the feature wheel spin has been selected, the triggering EGM (i.e. where the triggering event occurred) generates a feature wheel protocol containing all information required for the feature wheel to be displayed across each of the selected secondary displays 413-419 (e.g., a specific feature wheel operation, particular symbols to display, sequence of symbols, timing, where to begin/stop transitions, etc.). The information is communicated to the central game controller for coordination and distribution to the selected EGMs. In some examples, the central game controller communicates commands to coordinate all of the EGM secondary displays, including to the triggering EGM, to better sync display and operation of the feature wheel. Given the coordination information from the central game controller, the non-triggering EGMs employ stored media and/or sequence data to correctly display the feature wheel in sync with the other EGMs in the bank.

For example, upon receipt of the feature wheel protocol generated by the triggering EGM, each EGM can access the memory to identify media and/or data corresponding to the symbols selected for display, the sequence of the selected symbols in the spinnable feature wheel, when and where to begin/stop transitions from adjacent EGMs, etc. Each EGM is therefore configured to determine the location of the triggering EGM and the relative position of each other EGM, determine the start time and position of each symbol display in the spinnable feature wheel sequence, the speed for movement of symbols between EGM displays, and when to stop movement of the display symbols. This process provides a synchronized display of the spinnable symbols, such that the viewer perceives a smooth transition between displays of the selected symbols.

Alternatively, data to render the display of the feature wheel may be communicated to each of the EGMs in response to the trigger event. In this example, the central controller and/or the triggering EGM may transmit the relevant media and/or data corresponding to the feature wheel protocol to each EGM for implementation. Further, upon receipt of such a command from the central controller, each of the other EGMs switch from whatever is being displayed on the secondary displays to display the feature wheel.

During operation of the feature wheel sequence, a specific protocol is employed to ensure that the feature wheel is displayed and advances as desired in a variety of situations. This may include edge cases of messages, lockups with one or more component, expected or unexpected power-cycles, and/or system recovery operations at different times with EGMs in different states (e.g., availability). Moreover, once the feature wheel begins, it continues without the need for additional user input.

In some examples, if a secondary display of one or more of the non-triggering EGMs becomes unavailable during operation of the feature wheel, then the triggering EGM may continue the feature wheel in a standalone mode.

The game controller may feature state machine to ensure that, if the feature wheel was started without an available display for the feature wheel spin, or that the display goes offline during operation of the feature wheel, the feature wheel spin continues on at least the secondary display associated with the triggering EGM. If a secondary display does become unavailable, the associated EGM communicates the change in state to the central game controller to adjust the coordinated feature wheel spin accordingly.

The central game controller is configured to evaluate the status of the responsible EGM in response to a communication indicating a triggering event has occurred. If that EGM is available, the central game controller assigns ownership of the feature wheel operation to the EGM responsible for the triggering event. If, during operation of the feature wheel, the triggering EGM becomes unavailable, the central game controller is configured to cancel and/or reassign ownership of the feature wheel, as well as informing the remaining EGMs that the responsible EGM is unavailable.

An element of the feature wheel protocol is that the base game is able to continue play even as the secondary display becomes unavailable at any point in the feature sequence and still be able to continue the feature wheel on the main and top screen without interruption.

For example, once an EGM indicates that the secondary display is not available for use by the feature wheel spin protocol, the central game controller provides no additional commands to the impacted EGM. Thus, the EGM will not implement the feature wheel sequence on the respective secondary display, even if the EGM has information as to the start conditions, placement in the bank 311, etc. Even if the display becomes available during operation of the feature wheel, the previously unavailable EGM continues to operate in an individual, standalone (i.e. a "local mode"), and does not initiate the feature sequence.

The symbols displayed in feature wheel 411 can be selected to invoke a sense of winning and/or excitement in the player. In the example of FIG. 4, the symbols are shown to include a face of a president of the United States, which may or may not correspond to the theme of the base game. One or more of the symbols may include an identifier of a particular bonus/jackpot level or value (e.g., MINI, MINOR, MAXI). In some examples, the symbol may additionally or alternatively include an identifier of a number of credits or other value. Also, a multiplier 430 may be included in the symbol, as shown in the symbol displayed on monitor 419. In some examples, operation of the feature wheel may include multiple phases and/or available outcomes, each of which defines a different award.

In some examples, a second player who receives a trigger during a feature wheel spin that is already in progress may join the single feature wheel spin, or may opt to wait for their own spin (e.g., based on a trigger event on the player's respective gaming machine) after the first feature wheel spin is completed. If the second player joins the feature wheel spin, then both players receive the award identified by the identifier 429.

The current embodiment may block players with the same wager to play together on the single feature wheel spin on the spinnable feature wheel 411. The second player may either wait to play alone on the big wheel, or play on the personal video display (e.g., main display 435) on the second player's gaming machine.

For example, if a particular feature wheel spin allows for other players to join in the spin, separate player actuatable buttons 322 may be provided on the console of the gaming machines to allow the other players to select joining the feature wheel spin and/or opting out of the spin. A player who opts out waits until the first player to trigger the feature wheel spin has finished the feature wheel game. In some examples, the player who opts out of the spin may bank the feature wheel spins that the player has been awarded and accumulate the spins for later activation. A timer may be used to cause the bank of spins to cancel out if the spins are not performed in a set period of time.

Also, where the wager of a first player who triggers the feature wheel spin is different than the wager of the second player who joins the spin, the second player waits for the feature wheel spin to stop, since the prizes identified on the feature wheel symbols will be different for the two players.

Figure 6A:
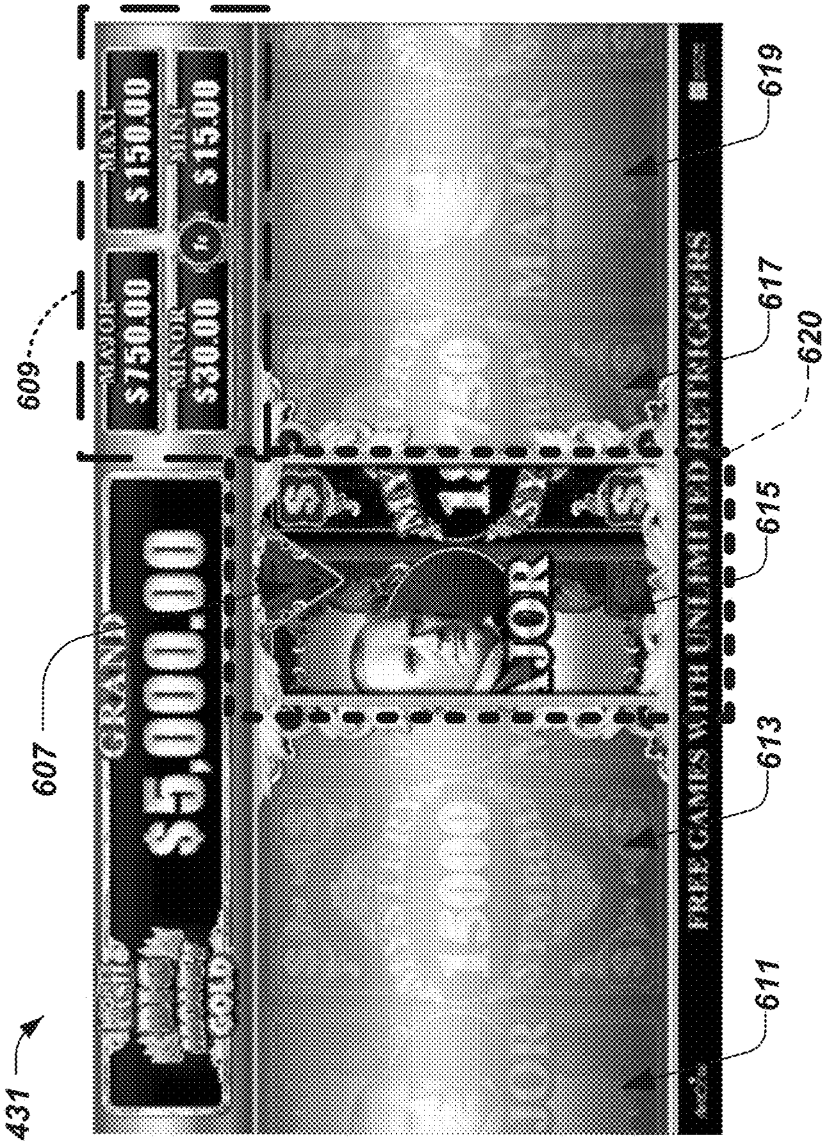
FIGS. 6A-6B illustrate example displays of the electronic gaming machines of FIGS. 3-4.
Figure 6B:
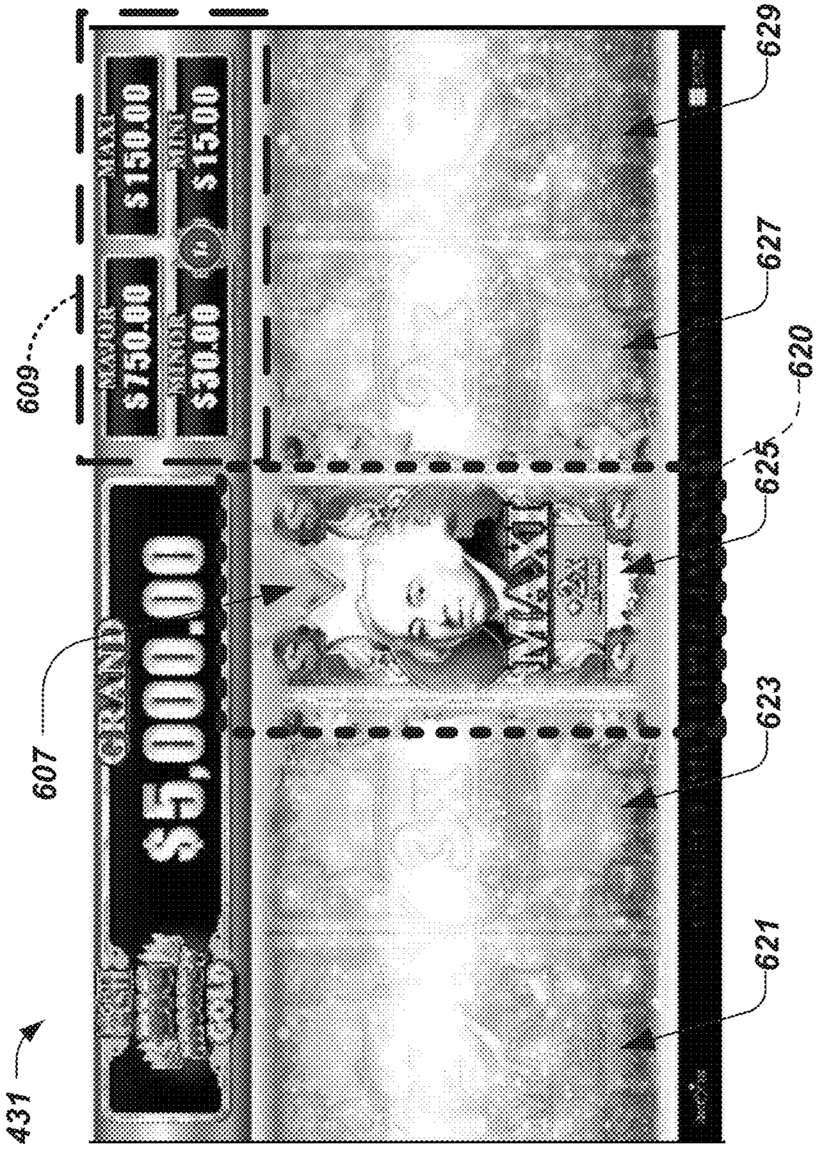

In another view of display 431 shown in FIG. 6A, the personal main display 431 of the gaming machine receiving the trigger matches its five symbols with those of the symbols on the secondary displays 413-419, and will present the symbols associated with the feature wheel operation to be spun in unison with the feature wheel spin on displays 413-419. The other EGMs' personal feature wheel on respective display areas 431 may not be matched nor spun following the trigger on the associated electronic gaming machine. As shown in FIG. 6A, symbols 611, 613, 615, 617 and 619 move horizontally across the display 431. For example, running concurrently with the feature wheel spin, the reels/symbol positions 611-619 of the top portion 431 sequence through the symbols, such as with the same or similar frequency, number of reels, symbols, outcomes, etc. Thus, the top portion 431 may faithfully replicate the sequence of the feature wheel spin being displayed on the secondary displays of the bank 302. For example, an identifier 607 can indicate a winning symbol or outcome, similar to identifier 429. Credit values 609 associated with a particular win may also be presented.

A central portion 620 of the display may provide an enhanced view of the moving symbols (e.g., as an unobstructed view, differently colored or otherwise distinguished), such that the viewer sees a continuously transitioning number of symbols. Thus, the beginning and end of each symbol 611-619 is visible, creating excitement during gameplay. Although the display 431 may proceed with symbols similar to the feature wheel displayed on the displays 413-419, some differences may exist. The differences may be specific to the player or EGM, or may represent differences in structural implementation of the feature wheel spin. In the example of FIG. 6A, there are five reels, 611-619, whereas, in the example of FIG. 4, only four EGMs and four secondary screens are employed. Although illustrated with five reels, the top portion 431 may have fewer or more reels, depending on the specific game.

As the five symbol locations move across display 431, they may be shown at the prior stopping point of the last feature wheel spin for that particular electronic gaming machine. When the player of a second gaming machine initiates a feature wheel spin after a first player's spin is completed, the symbols appearing on display 431 of the second gaming machine may begin at the location represented by symbols on the display 431 of the second gaming machine. Alternatively, a random position of the reel may be selected and presented on display 431 and on the secondary displays 413-419 from which the wheel spin begins its spin.

FIG. 6B shows an example top portion 431 of main display 435 once the feature wheel has come to a stop. As illustrated, a central reel 515 shows a symbol following a series of spins that represent the feature wheel spin from the secondary display(s). For example, the reels/symbol positions 621, 623, 625, 627, 629 represent the symbols displayed in the relative EGMs in the feature wheel spin. In particular, display position 625 represents the symbol selected as the winning symbol. As shown, displayed is a "MAXI" award, multiplied by a factor of two. Thus, the player can realize the winnings associated with the MAXI value (e.g., $150.00 shown in position 609) multiplied by the identified multiplier.

Figure 7:
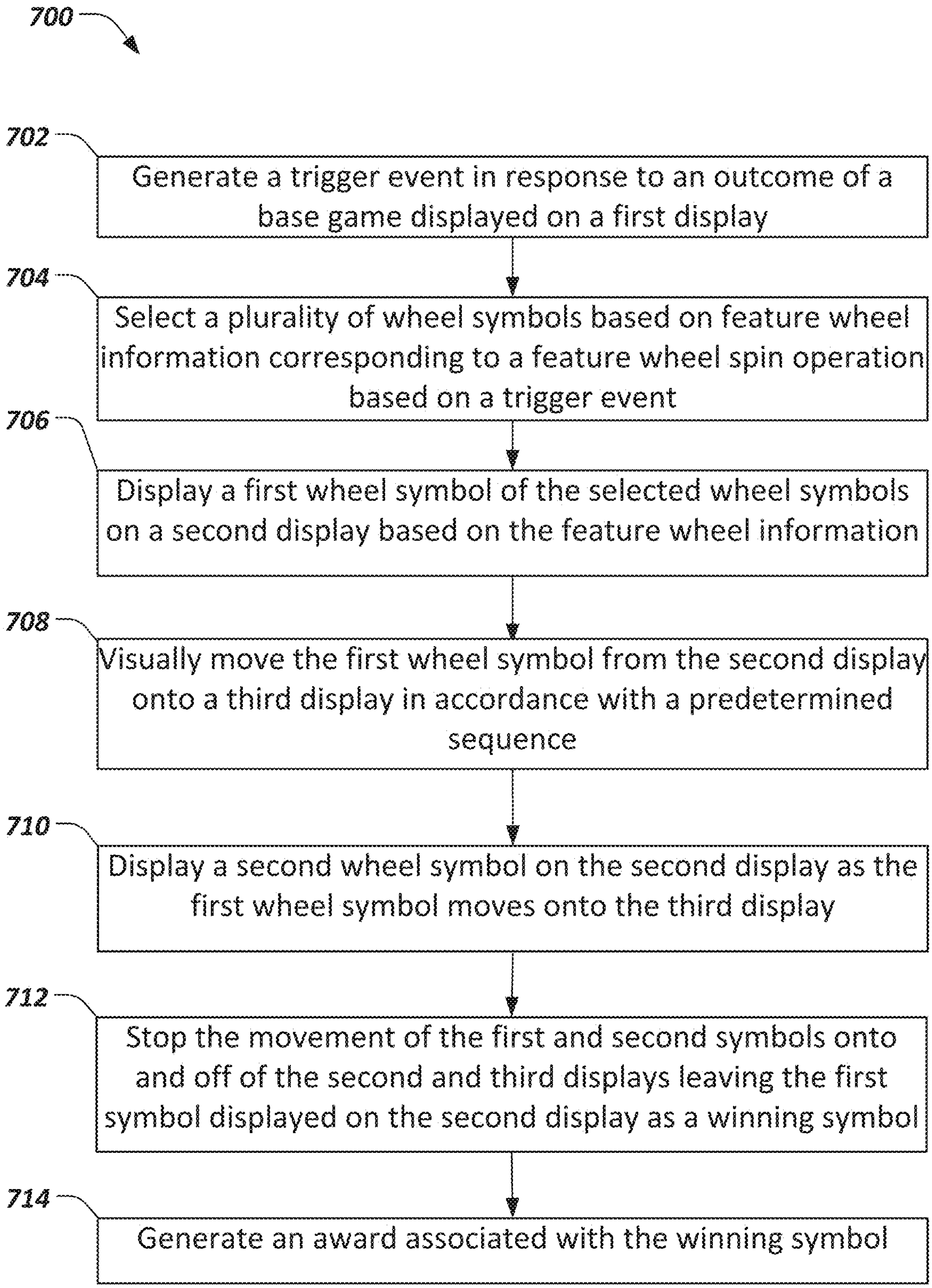
FIG. 7 is an example flowchart for a method of playing an interactive electronic gaming machine configured to display a spinnable feature wheel.

FIG. 7 illustrates a method 700 of playing an interactive electronic gaming machine configured to display a spinnable feature wheel, consistent with one or more examples provided herein. The method 700 can be executed as instructions or algorithms, stored on one or more memory devices (e.g., memory 208), and executed via one or more game controllers and/or central controller (e.g., game controller 204, via one or more processors 204), as provided with respect to FIG. 2.

In block 702, a trigger event is generated in response to an outcome of a base game displayed on a first display (e.g., a personal or main display 435 of EGM 421) of a first EGM. In block 704, a plurality of wheel symbols are selected based on feature wheel information corresponding to a feature wheel spin operation based on the trigger event, via a game controller.

In block 706, a first wheel symbol of the selected wheel symbols is displayed on a second display (e.g., secondary display 413 located above EGM 421) based on the feature wheel information. In block 708, the first wheel symbol is visually moved from the second display onto a third display (e.g., secondary display 415 located above EGM 423) in accordance with a predetermined sequence (e.g., based on the feature wheel information). In some examples, the second display and the third display are arranged side by side, such that the movement of the symbols has the appearance of a horizontally spinning reel.

In block 710, a second wheel symbol is displayed on the second display as the first wheel symbol moves onto the third display. In some examples, each symbol is moved in a continuous loop from the second display to the third display for a predetermined period of time until the central game controller commands the symbols to stop move. Moreover, although two displays are described with respect to method 700, three or more displays may be used to display the symbols and the movement thereof. Further, any number of wheel symbols may be used, each of which may be displayed on each display during the feature wheel operation. In some examples, selected wheel symbols are displayed on fewer than all displays, and/or the transition of wheel symbols may not be displayed on all displays.

In block 712, the movement of the first and second symbols onto and off of the second and third displays is stopped, leaving the first symbol displayed on the second display as a winning symbol. Based on the winning symbol, an award is generated in block 714. Additionally, in some examples, the feature wheel operation is displayed on the first display associated with the trigger EGM concurrently with the feature wheel operation displayed over the second and third displays (and any additional secondary display participating in the feature wheel operation).

In various embodiments, the wheel spin is also displayed on the main display of the EGM triggering the wheel feature.

Those of ordinary skill will appreciate that (1) the trigger event; (2) the symbols displayed by the wheel; or (3) the award values associated with the symbols displayed by the wheel; or (4) any other determination or variable described or contemplated in the present disclosure may at least in part be (a) randomly determined; (b) predetermined; (c) determined based on a wager amount and/or level; (d) centrally determined; (e) determined based on a generated symbol or symbol combination; (f) determined based on player selection; (g) determined based on player skill; (h) determined based on a side wager or ante bet; (i) determined based on a status of the player; (j) determined as a combination of two or more determinations disclosed herein; etc.

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

The invention claimed is:

1. A gaming machine comprising:

a first display having a top portion and a base display to display an individual base game;

a second display; and a game controller executing instructions which cause the game controller to, at least:

receive an input to initiate a base game;

determine an outcome of the base game in response to the game play;

control the second display to display a first wheel symbol of a plurality of wheel symbols in response to a triggering event, wherein the triggering event is in response to the outcome of the base game played on the base display of the gaming machine;

control the second display to visually move the first wheel symbol from the second display onto a third display located with another gaming machine in accordance with a predetermined sequence;

control the second display to display a second wheel symbol of the plurality of wheel symbols as the first wheel symbol of the plurality of wheel symbols moves onto the third display;

stop the movement of the first wheel symbol and the second wheel symbol leaving the first wheel symbol displayed on the third display and the leaving second wheel symbol displayed on the second display as a winning wheel symbol; and control the top display portion of the first display to display, move and stop a duplicate of the plurality of wheel symbols in sync with the second and third displays in response to the trigger event.

2. The gaming machine of claim 1, wherein the instructions further cause the game controller to continue to move at least the first and second wheel symbols of the plurality of wheel symbols in a continuous loop from the second display to the third display and to the second display, for a predetermined period of time until the game controller commands the first and second wheel symbols of the plurality of wheel symbols to stop movement.

3. The gaming machine of claim 1, wherein the second display is located at an elevated position above the first display.

4. The gaming machine of claim 1, wherein the third display is located at an elevated position above the another gaming machine.

5. The gaming machine of claim 1, wherein the second and third displays are located in a bank of displays arranged to display the visual movement of the first and second symbols of the plurality of wheel symbols as a horizontally spinnable reel.

6. The gaming machine of claim 5, wherein a fourth display is located in the bank of displays, such that the visual movement of the plurality of wheel symbols of the horizontally spinnable reel is displayed across the second, third and fourth displays.

7. The gaming machine of claim 1, wherein the game controller is further configured to access feature wheel information comprising the predetermined sequence, the plurality of wheel symbols, or an order of gaming machines corresponding to a placement of the gaming machines in a bank of gaming machines.

8. The gaming machine of claim 1, wherein the gaming machine generates the predetermined sequence based on the triggering event.

9. A gaming system comprising:

a central controller executing instructions which cause the central controller to receive status information and determine availability of a plurality of gaming machines; and a gaming machine of the plurality of gaming machines comprising:

a credit input mechanism;

a first display;

a second display;

a cashout mechanism; and a game controller executing instructions which cause the game controller to, at least:

receive an input to initiate a base game;

determine an outcome of the base game in response to the game play;

upon occurrence of a trigger event in response to the outcome of the base game of the gaming machine, switch the central controller to a shared bonus display mode;

control the second display to display a first wheel symbol of a plurality of wheel symbols;

control the second display to visually move the first wheel symbol of the plurality of wheel symbols off the second display;

control a third display of another gaming machine of the plurality of gaming machines via the central controller to display the first wheel symbol in accordance with a predetermined sequence in response to a determination that the other gaming machine is available for control under the shared bonus display mode;

control the second display to display a second wheel symbol of the plurality of wheel symbols as the first wheel symbol of the plurality of wheel symbols moves onto the third display;

continue to move the first and second wheel symbols of the plurality of wheel symbols in a continuous loop from the second display to the third display for a predetermined period of time; and control a top display portion of the first display to display and move a duplicate of the plurality of wheel symbols in sync with the continuous loop displayed on the second and third displays in response to the trigger event.

10. The gaming machine of claim 9, wherein the game controller is further configured to select a first set of symbols as the plurality of wheel symbols move in response to a first triggering event, and select a second set of symbols as the plurality of wheel symbols move in response to a second triggering event.

11. The gaming machine of claim 9, wherein the first display is a touchscreen display, the game controller further configured to receive a user input across the touchscreen display to determine a wager amount for the base game or a feature wheel spin operation.

12. The gaming machine of claim 9, wherein the plurality of wheel symbols comprise at least one of a pictographic image or a credit value.

13. The gaming machine of claim 9, wherein the game controller is further configured to adjust an amount of the payout based on a value associated with different symbols of the plurality of wheel symbols.

14. The gaming machine of claim 9, wherein the central controller is further configured to:

receive status information from a third gaming machine of the plurality of gaming machines;

determine the third gaming machine is available for control under the shared bonus display mode based on the status information; and adjust coordination of the display of the plurality of wheel symbols to visually move the first wheel symbol of the plurality of wheel symbols from the third display to a fourth display of the third gaming machine.

15. The gaming machine of claim 9, wherein the central controller is further configured to:

receive status information from a third gaming machine of the plurality of gaming machines;

determine the third gaming machine is unavailable for control under the shared bonus display mode based on the status information; and adjust coordination of the display of the plurality of wheel symbols to avoid the third gaming machine.

16. A method of employing a plurality of gaming machines to display a spinnable feature wheel, the method comprising:

receiving an item to establish a credit balance via a credit input, the credit balance being increasable and decreasable based at least on wagering activity;

receiving an input to initiate a base game;

determining an outcome of the base game in response to the game play;

generating a trigger event in response to the outcome of the base game being played and displayed on a first display of a first gaming machine of the plurality of gaming machines;

selecting, via a game controller, a plurality of wheel symbols based on the trigger event;

displaying a first wheel symbol of the plurality of wheel symbols on a second display of the first gaming machine of the plurality of gaming machines;

controlling a third display of a second gaming machine to transition from display of content corresponding to the second gaming machine to display the plurality of wheel symbols in response to the triggering event;

visually moving the first wheel symbol from the second display onto the third display of the second gaming machine of the plurality of gaming machines in accordance with a predetermined sequence;

visually moving a second wheel symbol on the second display as the first wheel symbol moves onto the third display;

stopping the movement of the first wheel symbol and the second wheel symbol leaving the first wheel symbol displayed on the third display and the second wheel symbol displayed on the second display as a winning symbol;

displaying, moving and stopping a duplicate of the plurality of wheel symbols on a top display portion of the first display in sync with the second and third displays in response to the trigger event; and increasing the credit balance by an amount corresponding to an award amount associated with the winning wheel symbol.

17. The method of employing a plurality of interactive gaming machines to display a spinnable feature wheel of claim 16, further comprising moving the first and second wheel symbols of the plurality of wheel symbols in a continuous loop from the second display to the third display to the second display, for a predetermined period of time until a central game controller commands the first and second wheel symbols of the plurality of wheel symbols to stop movement.

18. The method of employing a plurality of interactive gaming machines to display a spinnable feature wheel of claim 16, further comprising locating the second and third displays in a bank of displays arranged to display the visual movement of the first and second wheel symbols of the plurality of wheel symbols as a horizontally spinnable reel.

19. The method of employing a plurality of interactive gaming machines to display a spinnable feature wheel of claim 16, further comprising generating, via the first gaming machine of the plurality of gaming machines, the predetermined sequence based on the triggering event.

20. The method of employing a plurality of interactive gaming machines to display a spinnable feature wheel of claim 16, wherein the second display is located at an elevated position above the first gaming machine of the plurality of gaming machines and the third display is located at an elevated position above the second gaming machine of the plurality of gaming machines.

* * * * *